United States Patent
Saso et al.

(10) Patent No.: US 10,626,993 B2
(45) Date of Patent: Apr. 21, 2020

(54) GASKET AND METHOD OF MANUFACTURING THE SAME

(71) Applicant: NOK CORPORATION, Tokyo (JP)

(72) Inventors: Hidetoshi Saso, Fujisawa (JP); Yoshihiro Kurano, Kikugawa (JP); Takayuki Horimoto, Fujisawa (JP); Tetsuya Urakawa, Fujisawa (JP); Kenichi Oba, Fujisawa (JP); Takuro Nishimura, Fujisawa (JP); Hajime Yui, Fujisawa (JP)

(73) Assignee: NOK CORPORATION (JP)

( * ) Notice: Subject to any disclaimer, the term of this patent is extended or adjusted under 35 U.S.C. 154(b) by 103 days.

(21) Appl. No.: 15/578,556

(22) PCT Filed: Jun. 2, 2016

(86) PCT No.: PCT/JP2016/066328
§ 371 (c)(1),
(2) Date: Nov. 30, 2017

(87) PCT Pub. No.: WO2016/194991
PCT Pub. Date: Dec. 8, 2016

(65) Prior Publication Data
US 2018/0163869 A1 Jun. 14, 2018

(30) Foreign Application Priority Data

Jun. 4, 2015 (JP) .................................. 2015-113597
Jan. 22, 2016 (JP) .................................. 2016-010596

(51) Int. Cl.
*F16J 15/10* (2006.01)
*H01M 8/0271* (2016.01)
(Continued)

(52) U.S. Cl.
CPC ......... *F16J 15/102* (2013.01); *B29C 45/1418* (2013.01); *B29C 45/14754* (2013.01);
(Continued)

(58) Field of Classification Search
CPC ........ F16J 15/061; F16J 15/104; F16J 15/108; B32B 2581/00; H01M 8/0273; H01M 8/0276; H01M 8/0286
See application file for complete search history.

(56) References Cited

U.S. PATENT DOCUMENTS 4,748,092 A * 5/1988 Hekal ................. H01M 8/0273
  204/253
5,536,342 A * 7/1996 Reis ..................... H05K 9/0015
  156/64

(Continued)

FOREIGN PATENT DOCUMENTS

EP  1367301 A1  12/2003
EP  1717494 A1  11/2006
(Continued)

OTHER PUBLICATIONS

European Office Action for Application No. 16 803 425.4 dated Dec. 4, 2018 (6 pages).
Extended European Search Report for EP Application No. 16803425. 4, dated Jun. 7, 2018 (5 pages).

*Primary Examiner* — Nicholas L Foster
(74) *Attorney, Agent, or Firm* — Harness, Dickey & Pierce, P.L.C.

(57) ABSTRACT

The present invention improves the handling properties of a rubber-only gasket and the affixability thereof to an attachment position. To this end, the provided gasket is: obtained by combining a gasket body of the rubber-only type, and a carrier sheet that comprises a resin film and holds the gasket body in an un-adhered state; and characterized in that the gasket body is provided with an adhesive section or bonding (Continued)

section for adhering or bonding the gasket body to an attachment position when attaching the gasket body to the attachment position. The adhesive section or bonding section is prepared by providing the lateral surface of the gasket body with a projecting section, and coating the surface of the projecting section with an adhesive or bonding agent. The gasket body is to be used as a gasket for a fuel cell to be incorporated into a fuel cell stack.

8 Claims, 7 Drawing Sheets

(51) Int. Cl.
    *B29C 45/14*      (2006.01)
    *F16J 15/08*      (2006.01)
    *H01M 8/0273*     (2016.01)
    *H01M 8/0286*     (2016.01)
    *B29L 31/26*      (2006.01)

(52) U.S. Cl.
    CPC .......... *F16J 15/0806* (2013.01); *F16J 15/10* (2013.01); *F16J 15/104* (2013.01); *F16J 15/108* (2013.01); *H01M 8/0271* (2013.01); *H01M 8/0273* (2013.01); *H01M 8/0286* (2013.01); *B29C 45/14336* (2013.01); *B29C 2045/1477* (2013.01); *B29C 2045/14459* (2013.01); *B29L 2031/26* (2013.01)

(56) References Cited

U.S. PATENT DOCUMENTS

| | | | | |
|---|---|---|---|---|
| 5,564,714 | A * | 10/1996 | Katsuno | B25B 27/0028 277/630 |
| 7,001,686 | B2 * | 2/2006 | Wells | H01M 8/0204 429/535 |
| 8,304,119 | B2 * | 11/2012 | Kurano | F16J 15/0806 277/317 |
| 2004/0075224 | A1 * | 4/2004 | Kuroki | F16J 15/0818 277/650 |
| 2005/0077683 | A1 * | 4/2005 | Comert | B60R 13/06 277/300 |
| 2006/0131819 | A1 * | 6/2006 | Kurano | F16J 15/0806 277/628 |
| 2009/0075143 | A1 * | 3/2009 | Kurano | F16J 15/0806 429/407 |
| 2018/0104872 | A1 * | 4/2018 | Kurano | H01M 8/0276 |
| 2018/0163869 | A1 * | 6/2018 | Saso | F16J 15/0806 |
| 2018/0163870 | A1 * | 6/2018 | Saso | H01M 8/0271 |
| 2018/0313448 | A1 * | 11/2018 | Nishimura | H01M 8/0273 |

FOREIGN PATENT DOCUMENTS

| | | |
|---|---|---|
| JP | H09-066538 A | 3/1997 |
| JP | 2005-098476 A | 4/2005 |
| JP | 2008-223953 A | 9/2008 |
| JP | 2014-060133 A | 4/2014 |
| WO | WO-2008-126618 A1 | 10/2008 |

* cited by examiner

GASKET AND METHOD OF MANUFACTURING THE SAME

CROSS-REFERENCE TO RELATED APPLICATIONS

This application is a U.S. National Stage Application of International Application No. PCT/JP2016/066328, filed on Jun. 2, 2016, and published in Japanese as WO 2016/194991 on Dec. 8, 2016 and claims priority to Japanese Application No. 2015-113597, filed on Jun. 4, 2015 and Japanese Application No. 2016-010596, filed on Jan. 22, 2016. The entire disclosures of the above applications are incorporated herein by reference.

BACKGROUND OF THE INVENTION

Field of the Invention

The present invention relates to a gasket according to a seal technique, and a method of manufacturing the same. The gasket according to the present invention is used, for example, as a gasket for a fuel battery, or a general gasket for the other intended use.

Description of the Conventional Art

The gasket for the fuel battery includes various gaskets having various structures such as a rubber only type gasket which is constructed by a gasket single part made of a rubber-like elastic material (a rubber), a separator integrated gasket which is obtained by integrally molding the gasket made of the rubber-like elastic material in a separator, and a GDL integrated gasket which is obtained by integrally molding the gasket made of the rubber-like elastic material in a gas diffusion layer (GDL).

These gaskets have respective characteristics. However, since request for cost reduction is severe in recent years, a rubber only type gasket which can satisfy the request is going to be paid attention.

The rubber only type gasket is structured, for example, as shown in FIGS. 7A and 7B.

More specifically, a gasket 11 is formed into a flat surface shape (a flat plate shape) as a whole, and an outer peripheral seal portion 12 for sealing a periphery of a reaction surface of a fuel battery over all the periphery is provided like a frame shape. Further, since it is necessary to partition the reaction surface of the fuel battery and each of manifold portions, an inside seal portion 13 is integrally formed in an inner side of the outer peripheral seal portion 12. A cross sectional shape of the gasket 11 is formed, for example, into a circular cross section as shown in FIG. 7B.

However, in the gasket 11 for the fuel battery, there is room for further improvement in the following point.

More specifically, the gasket 11 for the fuel battery is set to a size, for example, about 400 mm×300 mm in an outer shape, and a cross sectional shape (a wire diameter) thereof is on the contrary set to be small (for example, the wire diameter of about 1 mm. Therefore, twist tends to be generated in the gasket 11 single part when being carried or when being stacked, and a handling workability (a handling performance) thereof is not good. Further, there is fear that displacement is generated when the gasket 11 is assembled in an assembled position.

The present invention is made by taking the above point into consideration, and an object of the present invention is to provide a gasket which can improve a handling workability of a rubber only type gasket and can also inhibit displacement from being generated when a gasket main body is assembled in an assembled position, and a method of manufacturing the gasket.

SUMMARY OF THE INVENTION

In order to achieve the object mentioned above, a gasket according to the present invention is characterized in that the gasket is constructed by a combination of a rubber only type gasket main body and a carrier sheet which is made of a resin film retaining the gasket main body in a non-bonded state, and the gasket main body is provided with an adhesive part or a bonding part for adhering or bonding the gasket main body to an assembled position when the gasket main body is assembled in the assembled position.

In the present invention, the handling workability of the gasket is improved by retaining the rubber only type gasket main body by the carrier sheet which is made of the resin film. Since the gasket main body is not bonded to the carrier sheet, the gasket main body can be detached from the carrier sheet when being assembled. When the gasket main body is assembled in the assembled position, it is possible to inhibit displacement from being generated after the assembly by adhering or bonding the gasket main body to the assembled position with the adhesive part or the bonding part provided in the gasket main body.

Since the gasket main body is formed into the flat surface shape (the flat plate shape) and the carrier sheet made of the resin film is also formed into the flat surface shape (the flat plate shape), there is fear that the gasket main body can not be firmly retained by the carrier sheet only putting the gasket main body on the carrier sheet. Therefore, in order to devise a countermeasure, it is preferable that a gasket retention portion having a three-dimensional shape which is deformed along an outer shape of the gasket main body is provided at a position which laps over the gasket main body in a plane in the carrier sheet, and the gasket main body is partly accommodated within the gasket retention portion. According to the structure, since the gasket main body is positioned in the plane in relation to the carrier sheet, the gasket main body can be firmly retained by the carrier sheet.

As the adhesive part or the bonding part, the adhesive part may be obtained by directly applying an adhesive agent or a bonding agent to a part or a whole on a plane of the gasket main body, however, the adhesive part or the bonding part may be obtained by setting a projecting portion in a side surface of the gasket main body and applying the adhesive agent or the bonding agent onto a surface of the projecting portion. In this case, the gasket main body takes charge of a sealing function, and the adhesive part or the bonding part takes charge of a displacement suppressing function and fixing function on the basis of an adhesion or a bonding, whereby both the functions can be achieved in a shared manner.

In the case that the adhesive agent or the bonding agent is applied to a whole surface of a mounting surface of the gasket main body to the other assembled position, the adhesive agent or the bonding agent is also applied to an inside portion (a portion in a fuel battery reaction surface side) in the mounting surface of the gasket main body. As a result, there may be fear that a performance of the fuel battery is lowered by elution of an adhesive agent component or a bonding agent component, and a durability is lowered due to contact of the adhesive agent or the bonding agent with a subject to be sealed (a cooling water). Consequently, in order to devise a countermeasure, it is preferable that the adhesive part or the bonding part is provided only in an outside portion in the mounting surface of the gasket main body by applying the adhesive agent or the bonding agent only to the outside portion (a portion in an ambient air side) in the mounting surface of the gasket main body, and an inside portion in the mounting surface of the gasket main body is provided with a contact portion where the gasket main body directly comes into contact with the other assembled position without interposition of the adhesive agent or the bonding agent. According to this structure, since the adhesive agent component or the bonding agent component does not elute to the fuel battery reaction surface side, it is possible to inhibit the performance of the fuel battery from being lowered. Further, since the adhesive agent or the bonding agent does not come into contact with the subject to be sealed (the cooling water), it is possible to inhibit the durability from being lowered.

The gasket according to the present invention is used, for example, as the gasket for the fuel battery. Since the number of stack lamination is larger in the fuel battery, a small thickness is required in the gasket. Since the gasket having the small thickness tends to be twisted, the handling workability is not good. Therefore, it is extremely effective for achieving efficiency of a stacking work to improve the handling workability by combining the gasket main body with the carrier sheet which is made of the resin film, in a field of the gasket for the fuel battery which tends to be twisted due to the small thickness.

A method of manufacturing a gasket sequentially executes a step of mold clamping a metal mold in a state in which a carrier sheet having a flat surface shape is sandwiched in parting portions of the metal mold forming a gasket main body, a step of forming the gasket main body by the metal mold, and forming a gasket retention portion having a three-dimensional shape by deforming a part in a plane of the carrier sheet along an inner surface of a metal mold cavity with a forming material filling pressure at this time, and a step of opening the mold after the formation of the gasket main body, and thereafter taking out the gasket main body and the carrier sheet simultaneously from the metal mold, and further executes a step of applying an adhesive agent or a bonding agent to the gasket main body. The carrier sheet is initially formed into the flat surface shape, however, is partly formed into a three-dimensional shape by utilizing the forming material filling pressure and is fitted to the gasket main body at the position which is formed into the three-dimensional shape. Therefore, the carrier film is high in a retention force.

Effect of the Invention

According to the present invention, since the rubber only type gasket main body is combined with the carrier sheet which is made of the resin film, it is possible to improve the handling workability of the rubber only type gasket. Further, since the gasket main body is provided with the adhesive part or the bonding part, it is possible to inhibit the displacement from being generated in the gasket main body when the gasket main body is assembled in the assembled position.

BRIEF EXPLANATION OF THE DRAWINGS

FIGS. 1A and 1B are views showing a gasket according to an embodiment of the present invention, in which FIG. 1A is a plan view and FIG. 1B is an enlarged cross sectional view along a line C-C in FIG. 1A;

FIGS. 2A and 2B are views showing a gasket according to the other embodiment of the present invention, in which FIG. 2A is a plan view and FIG. 2B is an enlarged cross sectional view along a line D-D in FIG. 2A;

FIGS. 7A and 7B are views showing a gasket according to a conventional art, in which FIG. 7A is a plan view of the same and FIG. 7B is an enlarged cross sectional view along a line B-B in FIG. 7A.

DETAILED DESCRIPTION OF PREFERRED EMBODIMENTS

The following embodiments are included in the present invention.

(1) The present invention relates to a gasket with a carrier sheet (a film carrier).

(2) A gasket with a carrier sheet in which a film for a carrier is simultaneously formed when a rubber only gasket is manufactured. The present gasket is structured such that the carrier film can be detached at a time of stacking.

(3) A stack assembling property is improved by the carrier film. The carrier film at the center of the gasket or in an end portion thereof is used for an automatic carrier when being assembled by stacking. Since the gasket is corrected by the carrier film, there is no problem in twist. Since the carrier film can be detached at a time of stacking, reduction of a vehicle weight is caused.

(4) Since the displacement may be generated after the assembly in the rubber only gasket, the adhesive part or the bonding part is provided in a part of the gasket with the carrier sheet.

(5) The adhesive part or the bonding part is manufactured by mounting the adhesive agent or the bonding agent after the formation of the gasket main body. Further, the adhesive agent or the bonding agent can be manufactured by an integrally forming method in addition to the method of mounting the formation, however, a method of manufacturing thereof is appropriately set in correspondence to a shape and an assembling method of the other assembled member such as a separator.

(6) The adhesive agent can employ any adhesive agent such as rubber type, silicone type, urethane type or acrylic type adhesive agent. The bonding agent can employ any bonding agent such as gum type or resin type bonding agent. An installation location of the adhesive agent or the bonding agent is not particularly limited, but the adhesive agent or the bonding agent can be installed at any location and may be installed in a whole periphery or a part of the gasket.

Embodiment

Next, a description will be given of an embodiment according to the present invention with reference to the accompanying drawings.

Figure 1A:
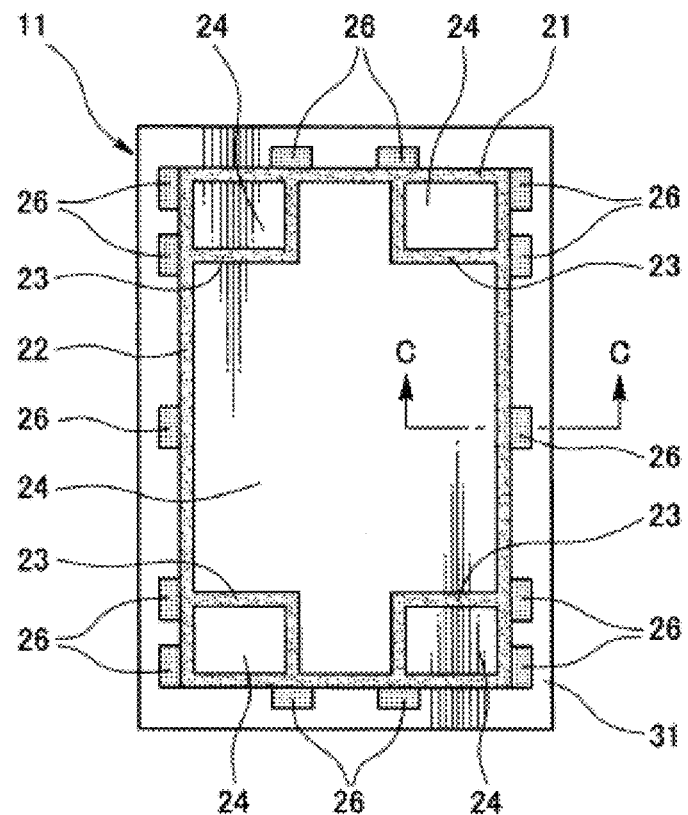

As shown in FIG. 1A, a gasket 11 according to the embodiment is constructed by a combination of a rubber only type gasket main body 21 and a carrier sheet (a film carrier) 31 which is made of a resin film retaining the gasket main body 21 in a non-bonded state. The gasket main body 21 is used as a gasket for a fuel battery.

Figure 1B:
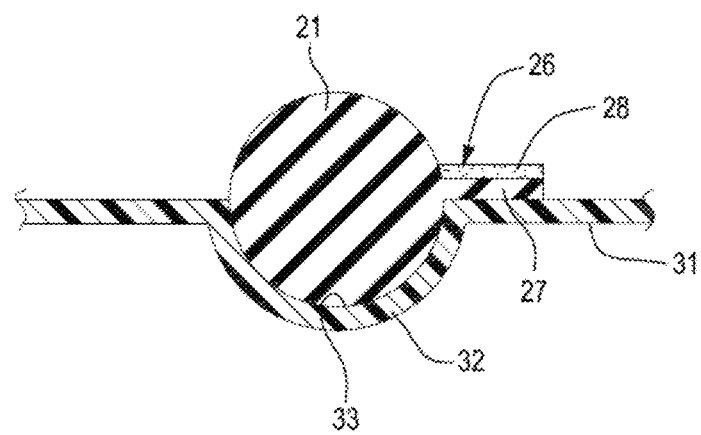

The gasket main body 21 is formed into a flat surface shape (a flat plate shape) by a predetermined rubber-like elastic material (for example, VMQ, PIB, EPDM and FKM), and integrally has an outer peripheral seal portion 22 which is provided for sealing around a reaction surface of a fuel battery over all the periphery and has a frame shape, and an inside seal portion 23 which is provided for sealing a partition portion between the reaction surface of the fuel battery and each of manifold portions, as constructing elements thereof. A cross sectional shape of the gasket main body 21 is formed into, for example, a circular cross section as shown in FIG. 1B. Reference numeral 24 denotes a penetration portion (a space portion) which passes through the gasket main body 21 in its thickness direction. The gasket main body 21 is formed into a rectangular flat surface shape, is set its planar size to have an outer shape with about 400 mm (vertical)×about 300 mm (horizontal), and is set its thickness, that is, its wire diameter to be approximately 1 mm.

The carrier sheet 31 is formed into a flat surface shape (a flat plate shape) by a predetermined resin film, and is formed into a rectangular flat surface which is one size larger than the gasket main body 21. The resin film employs, for example, a polypropylene film having a thickness of 0.2 mm, and is used by cutting the polypropylene film into a flat surface shape having the size mentioned above. General resin materials such as polyethylene and polystyrene can be used in addition to the polypropylene for the resin film. A thickness of the film is preferably set to be between 0.1 mm and 0.3 mm in correspondence to the wire diameter and the cross sectional shape of the gasket main body 21.

A gasket retention portion 32 having a three-dimensional shape is provided at a position which is arranged on a part of the flat surface of the carrier sheet 31 and laps over the gasket main body 21 in a plane, the gasket retention portion 32 being formed into a shape which is deformed along an outer shape of the gasket main body 21 (an outer contour line in the cross sectional shape of the gasket main body 21). A part of the gasket main body 21 in a thickness direction is accommodated in the gasket retention portion 32. Since the cross sectional shape of the gasket main body 21 is formed into the circular cross section as mentioned above in the embodiment, a cross sectional shape of the gasket retention portion 32 is formed into a circular arc cross sectional shape (a semicircular shape) in correspondence thereto. A part in one side in the thickness direction of the gasket main body 21 is accommodated within a space portion (a concave portion) 33 which is provided in a back surface side of the gasket retention portion 32 and is formed into a groove shape, on the basis of the provision of the gasket retention portion 32 having the circular arc cross sectional shape as mentioned above.

Since the gasket main body 21 is not bonded to the carrier sheet 31, the gasket main body 21 can be detached from the carrier sheet 31 when being stacked. In the case that the gasket main body 21 is formed in a state in which the carrier film 31 is inserted into a metal mold 41 which forms the gasket main body 21 as mentioned later, the gasket main body 21 is set to a state of being adhered to the carrier film 31 since the formed gasket main body 21 is provided with a adhesion. The adhesion has such a small adhesive force as to be detached by a chucking device. Therefore, in this case, the rubber only type gasket main body 21 is not bonded to the carrier film 31 which is made of the resin film, but is adhered in such a manner as to be capable of being peeled off. The adhesion described here corresponds to an adhesion achieved by a material of the gasket main body 21, and is different from an adhesion achieved by an adhesive part 26 mentioned later.

Further, a projection portion 27 is integrally provided in a side surface in an outer peripheral side of the gasket main body 21 in the side surface of the gasket main body 21, an adhesive agent 28 is applied to a surface in a side which comes into contact with the other assembled member (not shown) such as a separator at a time of being assembled in one surface of the projecting portion 27 in a thickness direction, and the adhesive part 26 in the gasket 11 is provided on the basis of combination of the projecting portion 27 and the adhesive agent 28.

The projecting portion 27 is provided as a plurality of tongue pieces along a peripheral direction of the gasket main body 21. As a result, in the embodiment, as shown by a plan view in FIG. 1A, the adhesive parts 26 are provided respectively at corner portions (four positions) and center portions (two positions) of longitudinal side edges of the outer peripheral seal portion 22 in the gasket main body 21, and positions (eight positions) where the outer peripheral seal portion 22 and the inside seal portion 23 intersect, that is, totally fourteen positions.

In the gasket 11 having the structure mentioned above, since the rubber only type gasket main body 21 is retained by the carrier sheet 31 which is made of the resin film, the gasket main body 21 is hard to be twisted when the gasket 11 is carried, and the gasket 11 can be easily carried. Further, since the gasket main body 21 is not bonded to the carrier sheet 31, the gasket main body 21 can be easily detached from the carrier sheet 31 when being stacked. Therefore, it is possible to improve a handling workability of the gasket 11.

Further, since the gasket retention portion 32 having the three-dimensional shape is provided in the carrier sheet 31 and a part of the gasket main body 21 is accommodated within the gasket retention portion 32, the gasket main body 21 is positioned on a plane in relation to the carrier sheet 31. Therefore, since the gasket main body 21 is not displaced in relation to the carrier sheet 31 when the gasket 11 is carried, the gasket main body 21 can be firmly retained by the carrier sheet 31.

Further, since the gasket main body 21 is provided with the adhesive part 26 which is formed by combining the projecting portion 27 and the adhesive agent 28, the gasket main body 21 can be firmly fixed by adhering the gasket main body 21 to the assembled position with the adhesive part 26 when the gasket main body 21 is assembled in the assembled position. Therefore, it is possible to inhibit the displacement after the assembly from being generated in the gasket main body 21.

With regard to the cross sectional shape of the gasket main body 21 and the cross sectional shape of the gasket retention portion 32 corresponding thereto, various cross sections can be thought in correspondence to the use conditions of the gasket main body 21, for example, the following cross sectional shapes can be employed.

Figure 2A:
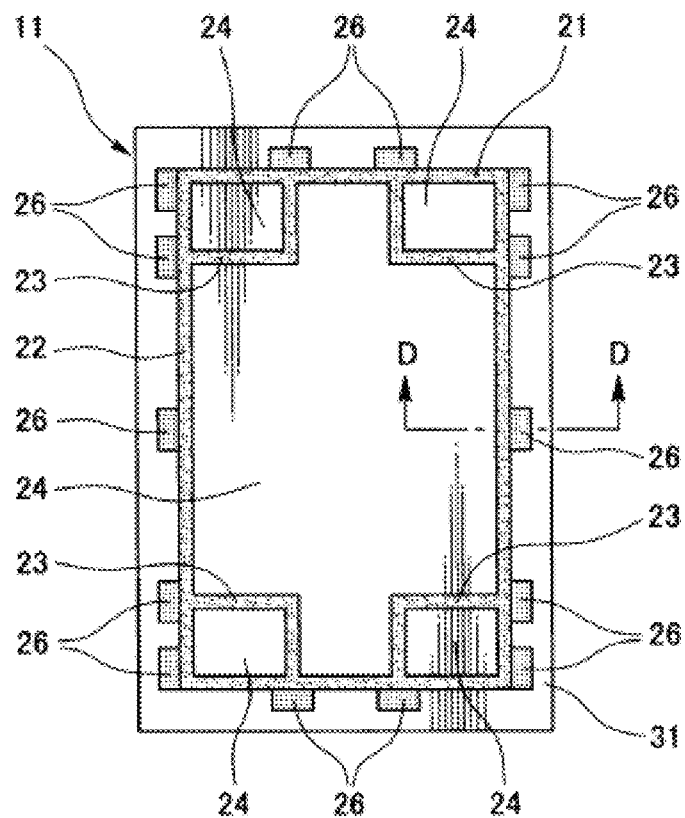

More specifically, in the other example in FIG. 2A, a seal lip 25 having a circular arc cross sectional shape (a semi-circular shape) is integrally formed in an upper surface of the gasket main body 21 having the rectangular cross sectional shape. In this case, since the lower half position in one side in the thickness direction of the gasket main body 21 is formed into a square cross section shape, the cross sectional shape of the gasket retention portion 32 is also formed into a square cross section shape.

Next, a description will be given of a method of manufacturing the gasket.

The method of manufacturing the gasket according to the embodiment is provided for manufacturing the gasket 11 shown in FIG. 2A. A metal mold for injection molding the rubber only type gasket main body 21 is used for manufacturing.

Figure 3A:
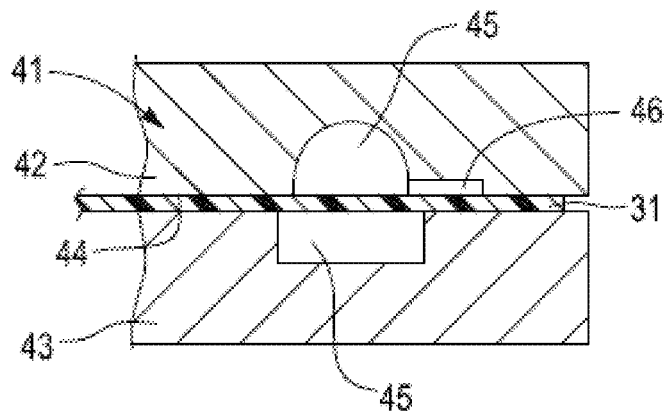
FIGS. 3A to 3C are step explanatory views of a method of manufacturing a gasket according to an embodiment of the present invention.

In the process, first of all, the carrier sheet 31 having the flat surface shape with a predetermined size is prepared. As shown in FIG. 3A, the metal mold 41 is clamped in a state in which the carrier sheet 31 is sandwiched in parting portions 44 of the metal mold 41.

The metal mold 41 has a combination of an upper mold (one split mold) 42 and a lower mold (the other split mold) 43, and cavity portions 45 are correspondingly provided, for example, half by half in the parting portions 44 of both the molds 42 and 43. Since the carrier sheet 31 is initially formed into the flat surface shape in its whole surface, the carrier sheet 31 is set to a state of cutting across the cavity portion 45. A projection forming portion 46 is provided as a part of the cavity portion 45 in a side surface portion of the cavity portion 45 in the upper mold 42, the projection forming portion 46 being provided for forming in the gasket main body 21 the projecting portion 27.

Figure 3B:
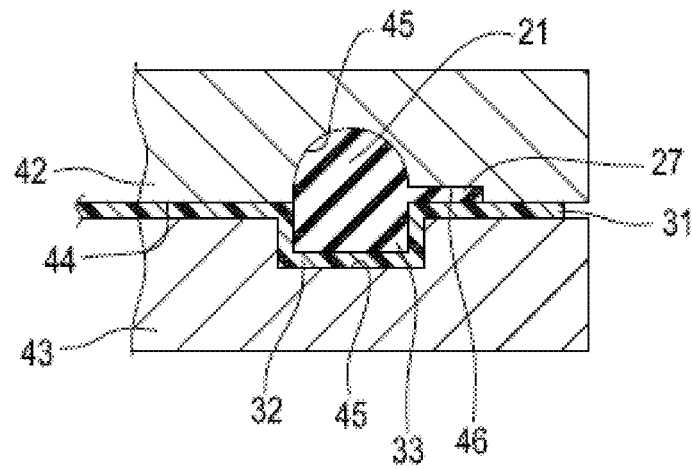

Next, as shown in FIG. 3B, the gasket main body 21 is formed by filling a molding material for forming the gasket main body 21 in the cavity portion 45 and heating the molding material. When the molding material is filled in the cavity portion 45, the carrier sheet 31 is pressed to an inner surface of the cavity portion 45 in its part (a portion within the cavity) of the plane by a forming material filling pressure, and is deformed (plastically deformed) into a shape which is along the inner surface of the cavity portion 45. As a result, the gasket retention portion 32 is formed.

Figure 2B:
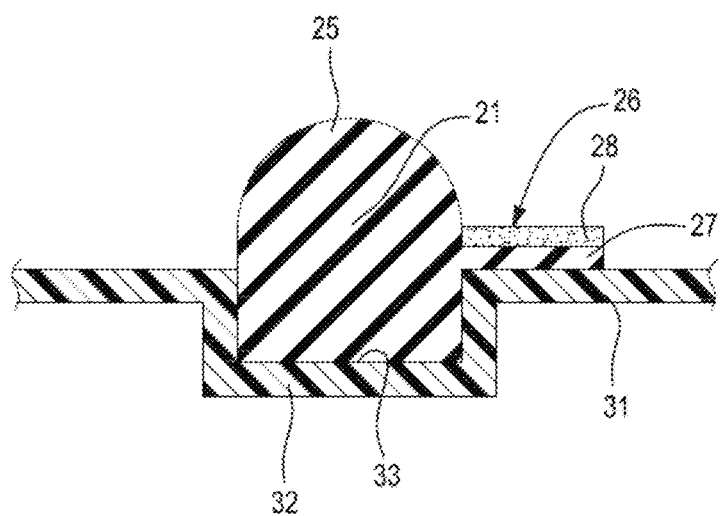
Figure 3C:
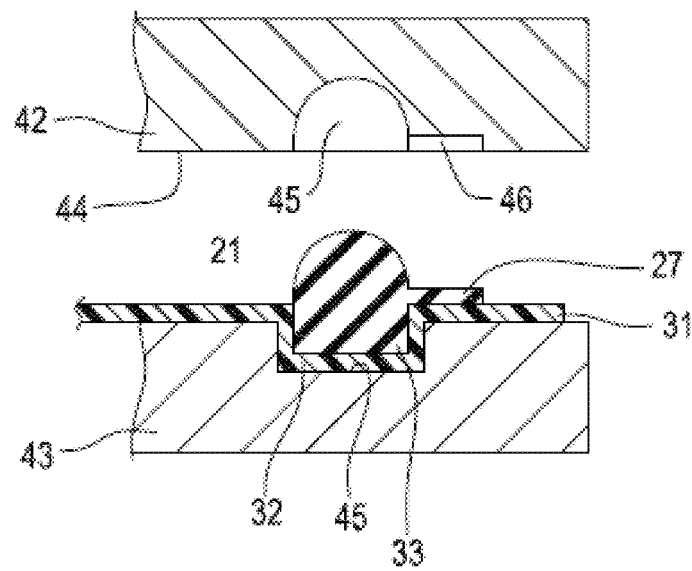

Next, as shown in FIG. 3C, the mold is opened after the formation of the gasket main body 21, and the gasket main body 21 and the carrier sheet 31 are simultaneously taken out of the metal mold 41. Then, as shown in FIG. 2B, the adhesive part 26 is made by applying the adhesive agent 28 on the projecting portion 27.

The gasket main body 21 and the carrier sheet 31 are carried and stored as a product in a state of being combined with each other. The torsion is hard to be generated in the gasket main body 21 which is retained by the carrier sheet 31. Therefore, the handling workability is improved in comparison with the case that the gasket main body 21 is handled as a single part. Further, as mentioned above, since the adhesive part 26 is provided in the gasket main body 21, the gasket main body 21 can be firmly fixed by adhering the gasket main body 21 to the assembled position with the adhesive part 26 when the gasket main body 21 is assembled in the assembled position. Therefore, it is possible to inhibit the displacement from being generated in the gasket main body 21.

Various aspects can be thought as the adhesive part 26, and the adhesive part 26 may be structured as follows.

Figure 4:
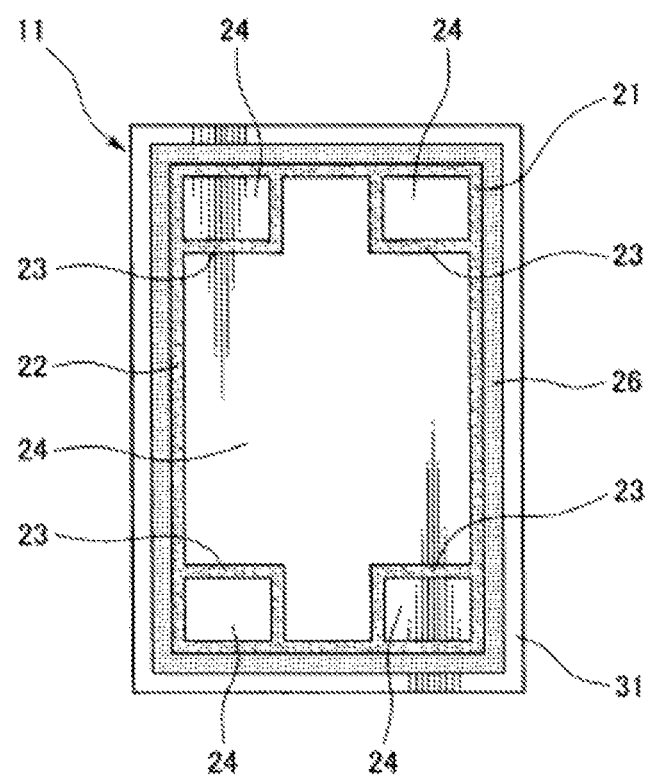
FIG. 4 is a plan view of a gasket according to the other embodiment of the present invention.

(1) In the above embodiment, the adhesive parts 26 are provided at a plurality of positions along the peripheral direction of the gasket main body 21. In place of this, the adhesive part 26 is provided continuously over a whole periphery of the gasket main body 21 as shown in FIG. 4.

Figure 5A:
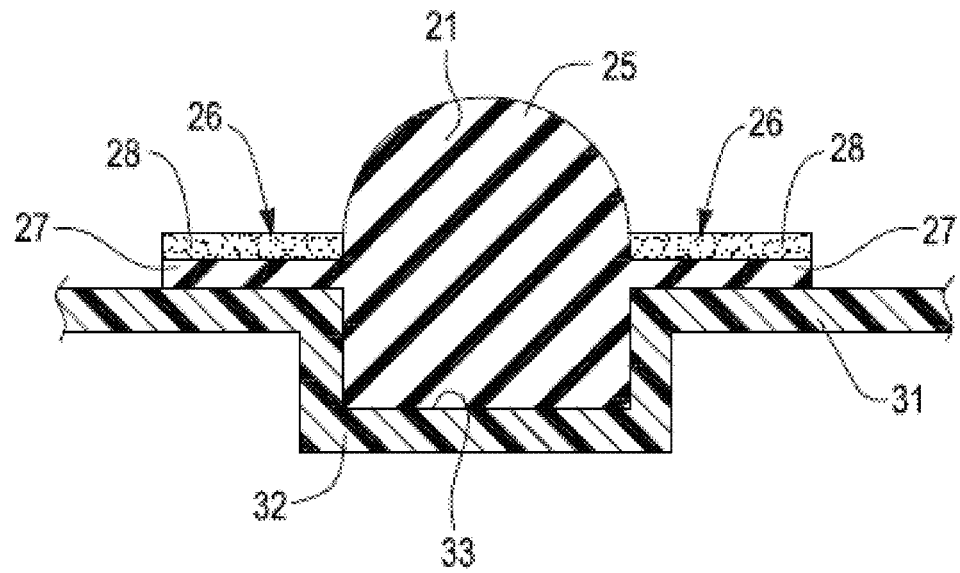
FIGS. 5A and 5B are both cross sectional views of a substantial part of a gasket according to the other embodiment of the present invention.

(2) In the above embodiment, the adhesive parts 26 are provided in the side surface in the outer peripheral side of the gasket main body 21. In place of this, the adhesive parts 26 are provided in a side surface in an inner peripheral side of the gasket main body 21 or the adhesive parts 26 are respectively provided in both of the side surface in the outer peripheral side and the side surface in the inner peripheral side of the gasket main body 21 as shown in FIG. 5A.

Figure 5B:
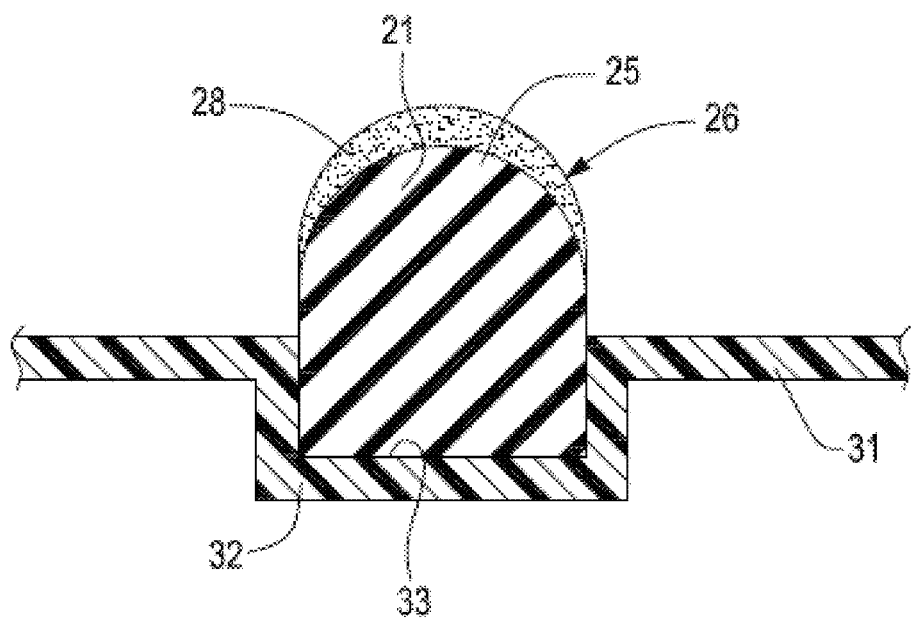

(3) In the above embodiment, the projection portion 27 is provided in the side surface of the gasket main body 21 and the adhesive agent 28 is applied to the one surface of the projecting portion 27, whereby the adhesive part 26 is formed. In place of this, the projecting portion 27 is omitted and the adhesive agent 28 is directly applied onto the plane of the gasket main body 21 as shown in FIG. 5B. This aspect is particularly effective in the case that the assembled position is greatly restricted in its space.

Further, in the case that the adhesive agent 28 is applied to a whole surface of the mounting surface of the gasket main body 21 to the other assembled position, the adhesive agent 28 is also applied to a portion in an inner side (a portion in the fuel battery reaction surface side) in the mounting surface of the gasket main body 21. As a result, there may be fear that a power generation performance of the fuel battery is lowered by the elution of the adhesive agent component to the fuel battery reaction surface side, and the durability is lowered by the contact of the adhesive agent 28 with the subject to be sealed (the cooling water). Accordingly, in order to devise a countermeasure, it is preferable that the adhesive part 26 is provided only in an outside portion in the mounting surface of the gasket main body 21 by applying the adhesive agent 28 only to an outside portion (a portion in an ambient air side) in the mounting surface of the gasket main body 21, and an inside portion in the mounting surface of the gasket main body 21 is provided with a contact portion where the gasket main body 21 directly comes into contact with the other assembled position without any interposition of the adhesive agent 28. According to this structure, since the contact portion forms the seal portion and the adhesive agent component does not elute to the fuel battery reaction surface side, it is possible to inhibit the power generation performance of the fuel battery from being lowered. Further, since the adhesive agent 28 does not come into contact with the subject to be sealed (the cooling water), it is possible to inhibit the durability of the fuel battery or the subject to be sealed from being lowered.

Figure 6A:
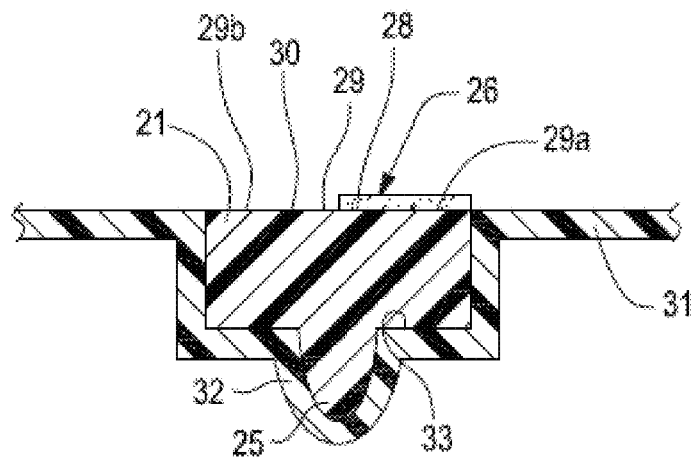
FIG. 6A is a cross sectional view of a substantial part of a gasket according to the other embodiment of the present invention.

FIG. 6A shows an example of this case. More specifically, the adhesive agent 28 is applied only to an outside portion (an ambient air side portion, that is, a right half portion in the drawing) 29a in a planate mounting surface 29 of the gasket main body 21 to the other assembled position, the adhesive part 26 is therefore provided only in the outside portion 29a in the mounting surface 29 of the gasket main body 21, and an inside portion (a fuel battery reaction surface side portion, that is, a left half portion in the drawing) 29b in the mounting surface 29 of the gasket main body 21 is formed as a contact portion 30 where the gasket main body 21 directly comes into contact with the other assembled position without any interposition of the adhesive agent.

Figure 6B:
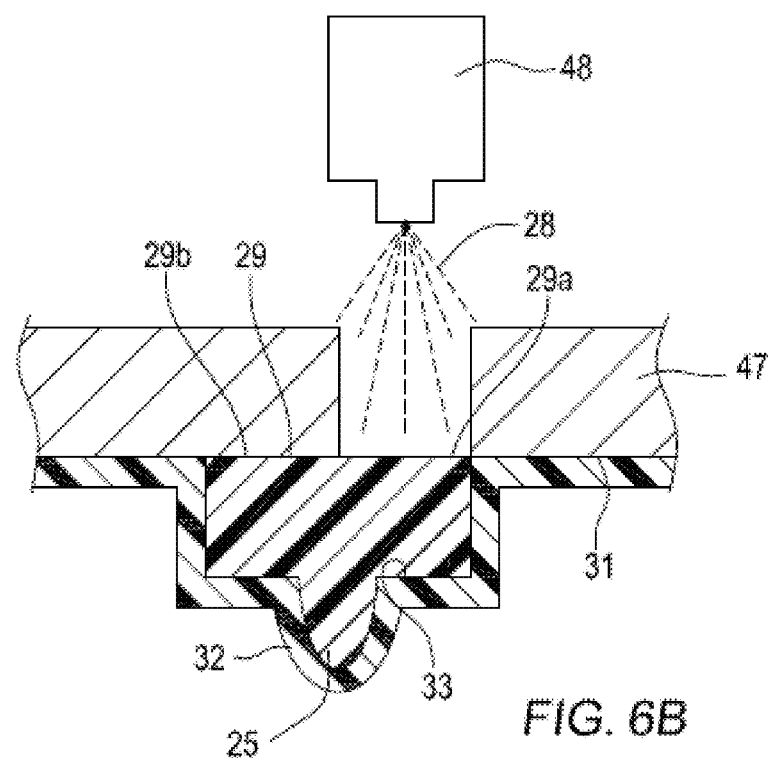
FIG. 6B is an explanatory view of a step of applying an adhesive agent in the gasket.
Figure 7A:
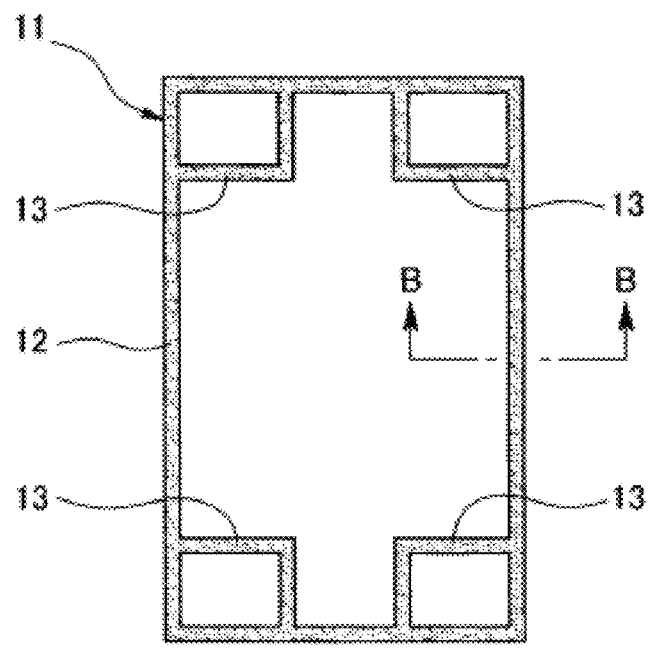
Figure 7B:
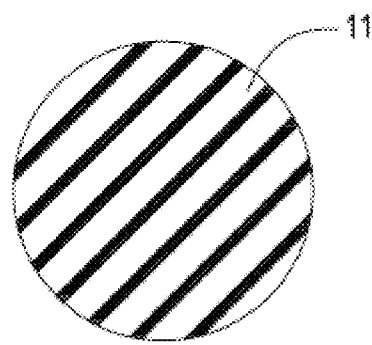

In the case that the adhesive agent 28 is partly applied as mentioned above, a spray method using a masking jig (a metal mask) 47 and a spray gun 48 is suitable for an applying method thereof, as shown in FIG. 6B. However, the adhesive agent 28 can be partly applied by a dispenser method or an ink jet method.

The adhesive agent 28 is applied only to the outside portion in the mounting surface 29 of the gasket main body 21, and there is no fear that the adhesive agent 28 elutes to the fuel battery reaction surface side. Therefore, the kind of the adhesive agent 28 is not limited as long as the rubber (the gasket main body 21) and the base member (the other assembled position) can be adhered.

A bonding agent may be employed in place of the adhesive agent 28. In this case, the adhesive part 26 is set to a bonding part.

What is claimed is:

1. A gasket comprising:
   a gasket main body which is made of rubber and includes a projection that extends outward from the gasket main body;
   a carrier sheet which is made of a resin film and includes a gasket retention portion that is shaped to correspond to a shape of the gasket main body such that the gasket retention portion is configured as a seat for the gasket main body for retaining the gasket main body therein; and
   an adhesive provided on the projection that is configured for adhering the gasket main body to another member, the adhesive being provided on a surface of the projection that faces away from the carrier sheet.

2. The gasket according to claim 1, wherein the projection extends from a side surface of the gasket main body.

3. The gasket according to claim 1, wherein the another member is part of a fuel battery that is installed in a fuel battery stack.

4. A method of manufacturing the gasket according to claim 1, the method comprising, sequentially:
   clamping the carrier sheet in a state in which the carrier sheet has a flat surface shape in a metal mold that is configured for forming the gasket main body;
   forming the gasket main body by inserting the rubber that forms the gasket main body into the metal mold;
   opening the mold after the formation of the gasket main body, and thereafter taking out the gasket main body and the carrier sheet simultaneously from the metal mold; and
   applying the adhesive to the gasket main body.

5. The gasket according to claim 2, wherein the another member is part of a fuel battery that is installed in a fuel battery stack.

6. A method of manufacturing the gasket according to claim 2, the method comprising, sequentially:
   clamping the carrier sheet in a state in which the carrier sheet has a flat surface shape in a metal mold that is configured for forming the gasket main body;
   forming the gasket main body by inserting the rubber that forms the gasket main body into the metal mold;
   opening the mold after the formation of the gasket main body, and thereafter taking out the gasket main body and the carrier sheet simultaneously from the metal mold; and
   applying the adhesive to the gasket main body.

7. A method of manufacturing the gasket according to claim 3, the method comprising, sequentially:
   clamping the carrier sheet in a state in which the carrier sheet has a flat surface shape in a metal mold that is configured for forming the gasket main body;
   forming the gasket main body by inserting the rubber that forms the gasket main body into the metal mold;
   opening the mold after the formation of the gasket main body, and thereafter taking out the gasket main body and the carrier sheet simultaneously from the metal mold; and
   applying the adhesive to the gasket main body.

8. A method of manufacturing the gasket according to claim 5, the method comprising, sequentially:
   clamping the carrier sheet in a state in which the carrier sheet has a flat surface shape in a metal mold that is configured for forming the gasket main body;
   forming the gasket main body by inserting the rubber that forms the gasket main body into the metal mold;
   opening the mold after the formation of the gasket main body, and thereafter taking out the gasket main body and the carrier sheet simultaneously from the metal mold; and
   applying the adhesive to the gasket main body.

* * * * *